United States Patent [19]
Lee et al.

[11] Patent Number: 6,016,552
[45] Date of Patent: Jan. 18, 2000

[54] OBJECT STRIPING FOCUSING ON DATA OBJECT

[75] Inventors: Jack Y. B. Lee, Kwun Tong; Po C. Wong, One Shatin, both of The Hong Kong Special Administrative Region of the People's Republic of China

[73] Assignee: The Chinese University of Hong Kong, Shatin, The Hong Kong Special Administrative Region of the People's Republic of China

[21] Appl. No.: 08/870,898

[22] Filed: Jun. 6, 1997

[51] Int. Cl.[7] .................................................. G06F 11/00
[52] U.S. Cl. ............................................................ 714/6
[58] Field of Search ............................. 395/182.04, 181, 395/180; 326/10; 711/114; 707/202; 371/40.11; 714/1, 2, 6

[56] References Cited

U.S. PATENT DOCUMENTS

| | | | |
|---|---|---|---|
| 4,761,785 | 8/1988 | Clark et al. | 371/51 |
| 4,993,030 | 2/1991 | Krakauer et al. | 371/40.1 |
| 5,130,992 | 7/1992 | Frey, Jr. et al. | 371/40.1 |
| 5,202,799 | 4/1993 | Hetzler et al. | 360/48 |
| 5,522,032 | 5/1996 | Franaszek et al. | 395/182.04 |
| 5,537,567 | 7/1996 | Galbraith et al. | 395/441 |
| 5,574,882 | 11/1996 | Menon et al. | 395/441 |
| 5,613,059 | 3/1997 | Stallmo et al. | 395/182.04 |
| 5,623,595 | 4/1997 | Bailey | 395/395 |
| 5,708,769 | 1/1998 | Stallmo | 395/182.04 |
| 5,737,549 | 4/1998 | Hersch et al. | 395/309 |

OTHER PUBLICATIONS

Tewari et al., "High Availability in Clustered Multimedia Servers", IEEE, Proceedings of the Twelfth Intl Confference on Data Engineering, pp. 645–654, Mar. 1996.

Lee et al., "A Server Array Approach for Video–on–demand Service on Local Area Networks", IEEE, pp. 27–33, Mar. 1996.

Vin et al., "Designing a Multiuser HDTV Storage Server", IEEE Journal on Selected Areas in Communications, vol. 11, No. 1, pp. 153–164, Jan. 1993.

Birk, "Random RAIDs with Selective Exploitation of Redundancy for High Performance Video Servers", IEEE Proceedings of the IEEE 7th International Workshop on Netwrok and Operating System Support for Audio and Video, pp. 13–23, May 1997.

Gemmell et al., "Multimedia Storage Servers: A Tutorial", Computer, vol. 28, Iss. 5, pp. 40–49, May 1995.

Vin et al., "Efficient Failure Recovery in Multi–Disk Multimedia Servers", Twenty–Fifth International Symposium on Fault–Tolerant Computing, IEEE, pp. 12–21, Jun. 1995.

*Primary Examiner*—Robert W. Beausoliel, Jr.
*Assistant Examiner*—Stephen C. Elmore
*Attorney, Agent, or Firm*—Fliesler, Dubb, Meyer & Lovejoy, LLP

[57] ABSTRACT

A technique to stripe a data object that focuses on the data object, but not on the storage media storing the data object. The data object, which can be of any size, is striped into data units at the object level. The technique includes the steps of striping a part of the data object that has not been striped before into at least one data unit. Then, at least one redundant unit is generated from the immediately striped at least one data unit to produce a stripe. The above steps are repeated until the entire data object is striped. In one embodiment, the striping step further includes the steps of (1) identifying the size of the data object; (2) determining the striping size based on the size of the data object; (3) receiving at least a part of the data object, with the size of that part being at least equal to the striping size; (4) striping the received data object into one or more data unit based on the striping size; and (5) if the part of the data object that has not been striped before is to be striped into more than one data unit, then repeating from the step of receiving to generate the data units.

16 Claims, 15 Drawing Sheets

OBJECT STRIPING FOCUSING ON DATA OBJECT

BACKGROUND

The present invention relates generally to storing data to an array of storage media or servers, and more particularly to methods to stripe the data to store in the array of storage media or servers.

In our information age, it is common to use an array of storage media to hold information. The information can be represented as data objects, whose sizes can range from kilobytes to gigabytes. If a data object is stored in one storage medium, and if the demand on that data object is much higher than other objects, the loading on that storage medium becomes much higher than others. This creates load imbalance. One typical way to balance the load is to stripe the data object into data units, and to store the units into the storage media in a round-robin fashion. This is the storage approach behind typical disk arrays, and the approach has also been extended to server arrays. An extensive discussion of the extension can be found, for example, in an article, entitled, "A Server Array Approach for Video-on-demand Service on Local Area Networks," published in INFOCOM '96, on March 1996, by Lee and Wong. The article describes an array of servers accessed by a number of clients.

A typical disk array system has a few different configurations. When a user formats a disk array, one configuration is selected. From then onwards, the organization and the size of the data units are fixed, with the storage spaces at each disk drive divided into units of the fixed striping size. Fixing the organization implies fixing the storage location of the data units of the data objects. Not only are the locations for the storage of the data objects fixed, the locations for the storage of redundant units or symbols are also fixed.

Redundant symbols or units are stored for fault tolerance reasons. In case one or more of the storage media fail, with the right level of redundancy based on the redundant symbols, the lost data can be restored. In a disk array system, the locations or sectors holding the redundant units are also fixed.

This organization is applied to all types of data objects. After a data object is striped into the fixed striping size, typically the data units are stored in the media in a round-robin fashion, skipping locations for redundant units wherever they exist.

A commonly used term in the disk array system is a stripe, which is defined as a group of data units and one or more redundant units that are generated by the data units. A stripe unit can be a data unit or a redundant unit.

After the data units are stored in the media, values for the redundant units are calculated. This is done stripe by stripe across the storage media. The above described process to store data into storage media is known as storage striping.

FIG. 1 shows one way to stripe a data object using storage striping. Each box in FIG. 1 denotes a stripe unit, such as 150, which denotes a number of bytes of data, such as 64 Kilobytes. Each stripe unit may store one or more symbols. Each vertical column of stripe units denotes the units stored within one storage medium or one server; for example, the units 152 and 154 are in the medium 156. With five columns shown in FIG. 1, there are five storage media or servers. Each row of stripe units represent a stripe; for example, the units 158 and 160 are two units for the stripe 162. In this example, each stripe also includes a redundant unit, such as 161. The locations for the redundant units are fixed, such as the locations for the units 161 and 164. The data units are stored around the redundant units. The redundant unit within each stripe can be generated by performing the exclusive-or operation on all of the data units within the stripe. All data objects are striped the same way.

Typically, data objects are of different sizes. If the size of a data object is not an integral multiple of the size of a stripe unit, storage spaces will be wasted at the last storage unit. This is known as internal fragmentation, which increases overhead. One way to represent overheads is as follows:

Normalized Storage Overhead or NSO=(Storage overhead)/(Storage size of the data object).

FIG. 2 shows a graph of normalized storage overhead versus the size of a stripe unit in storage striping. One calculation to generate FIG. 2 is shown in Appendix A. As the size of a stripe unit increases, the normalized storage overhead increases correspondingly, and the relationship is approximately linear. Note that storage overhead becomes impractical if the size of a stripe unit is larger than a few tens of kilobytes. The graph also shows the effect of having redundancy in the system for fault tolerance. It directly increases storage overhead, as shown in FIG. 2, because redundant units need additional storage.

Another issue to consider in a disk array system is on retrieving a data object from the storage media. A retrieval request for a data object can generate multiple retrieval operations in the storage media. For example, if the data object occupies one megabyte and the size of a stripe unit is one kilobyte, then it takes one thousand operations to retrieve the data object.

To consider the retrieval issue, stripe units of a data object are assumed to pack using a minimum number of stripes. In other words, the stripe units of the data object are not spread among many stripes, but are concentrated in as few stripes as possible. From this assumption, an average number of retrieval per byte (ANR) is calculated against the size of a stripe unit. This average number of retrieval per byte is defined as the average number of retrieval required to get a byte if the striping unit size is known, and if the probabilities of retrieving object of any sizes are the same. Actually, the probability of retrieving objects of different sizes are different.

In one approximation, the probability of retrieving object of different sizes are assumed to follow the WebStone retrieval distribution. FIG. 3 shows the WebStone retrieval distribution for web servers. It plots the probability of retrieving an object having a certain size; for example, the probability of retrieving an object having the size of 500 bytes in a typical web server is 0.5. Based on the WebStone approximation, a weighted average number of retrieval per byte (WANR) is calculated against the size of striping units. FIG. 4 shows a graph of WANR against striping sizes for normal mode of operation, and for failure mode, where there is media or server failure. The plots are in the form of steps because the WebStone approximation only has five samples. One calculation to generate FIG. 4 is shown in Appendix B.

Referring back to FIG. 4, one can see that WANR increases rapidly for small stripe unit sizes (10 to 15 kilobytes). In order to have good retrieval performance, or to have low WANR, stripe unit sizes should be large, such as larger than 20 kilobytes. The figure also shows that for large stripe unit sizes (>20 kilobytes), failure mode requires significantly more retrieval. This is because using large striping sizes results in fewer stripes per data object, which in turn increases the significance of retrieving extra stripe units at the last stripe, when there is failure.

On overhead storage, one prefers low stripe unit size. However, on retrieval, one prefers high stripe unit size. FIG. 5 shows the tradeoff in storage striping between the two factors: weighted average number of retrieval per byte vs. normalized storage overhead. The figure shows the difficulty of achieving low overhead storage and high retrieval efficiency simultaneously based on storage striping.

The difficulty is not diminished when storage striping is applied to multimedia data objects, which can be of very different sizes—a HTML page of text may only occupy a few kilobytes, while a picture requires a few megabytes, and a compressed movie a gigabyte. If the size of the striping units is one kilobyte, accessing a movie will take tremendous number of retrieval. However, if the size of the striping units is one megabyte, a lot of space will be wasted to hold a page of text due to internal fragmentation.

It should be apparent that there is a need for a new method to stripe a data object to be stored in an array of storage media. The method should provide low overhead storage and high retrieval efficiency. Also, the method should be equally applicable to both an array of storage media and an array of servers.

SUMMARY OF THE INVENTION

The present invention provides a method known as object striping. It stripes a data object at the object level, not at the storage level. In storage striping, the locations for the stripe units are fixed. In other words, the locations for the redundant units are pre-set, with the data units positioned around them. In object striping, the positions of the redundant units are not pre-set; they are formed with the data units as a logical unit before they are stored in the storage media. The invented results provide low overhead storage and high retrieval efficiency at the same time. In addition, the present invention is applicable to data objects with significantly different data object sizes. The method can be applied to an array of storage media or an array of servers.

Instead of focusing on the formatted configuration of the storage media, the present invention changes the paradigm and concentrates on the data objects. In the prior art storage striping technique, the storage media are at the focal point. Once the storage media have been formatted, all types of data objects will be striped the same way. The data object might be a gigabyte movie or a kilobyte page of text. Both will have the same striping size, and their data units will be positioned around the pre-set locations of the redundant units.

In the present invention, data objects are at the focal point, with the striping process substantially de-coupled from the storage media. The redundant units and the data units are treated as a logical unit. The striping process is performed at the data object, and then redundant units are calculated. Both the data units and the redundant units can be stored in the storage media in a round-robin fashion. In object striping, the locations of the redundant units are not pre-defined. Different objects with different sizes can be striped differently.

In one embodiment, the invented method stripes a part of the data object that has not been striped before into a number of data units. Then at least one redundant unit is generated based on the immediately striped data units to generate a stripe. The invented process is repeated until the entire data object is striped. Note that in the present invention, a stripe is defined as one or more data units combined with one or more redundant units such that the redundant units are generated by the one or more data units.

In striping, the invented method first identifies the size of the data object, and determines the striping size. Then at least a part of the data object whose size is at least equal to the striping size is received, and striped into a data unit. The data units and the generated redundant units can be transmitted to the storage media in a round-robin fashion.

In another embodiment, the stripe unit size also depends on a number of other factors, which include the number of storage media or servers, the level of redundancy, and a user-configurable minimum striping size and maximum striping size. Based on these additional factors, data objects are striped.

The present invention provides a number of advantages. For example, it provides better throughput than storage striping. In one example, object striping has 40% higher throughput than storage striping.

Other aspects and advantages of the present invention will become apparent from the following detailed description, which, when taken in conjunction with the accompanying drawings, illustrates by way of example the principles of the invention.

Same numerals in FIGS. 1–15 are assigned to similar elements in all the figures. Embodiments of the invention are discussed below with reference to FIGS. 1–15. However, those skilled in the art will readily appreciate that the detailed description given herein with respect to these figures is for explanatory purposes as the invention extends beyond these limited embodiments.

DETAILED DESCRIPTION OF THE INVENTION

In the present description, the invented object striping techniques are applied to servers. Nevertheless, the techniques are equally applicable to storage media.

Figure 1:
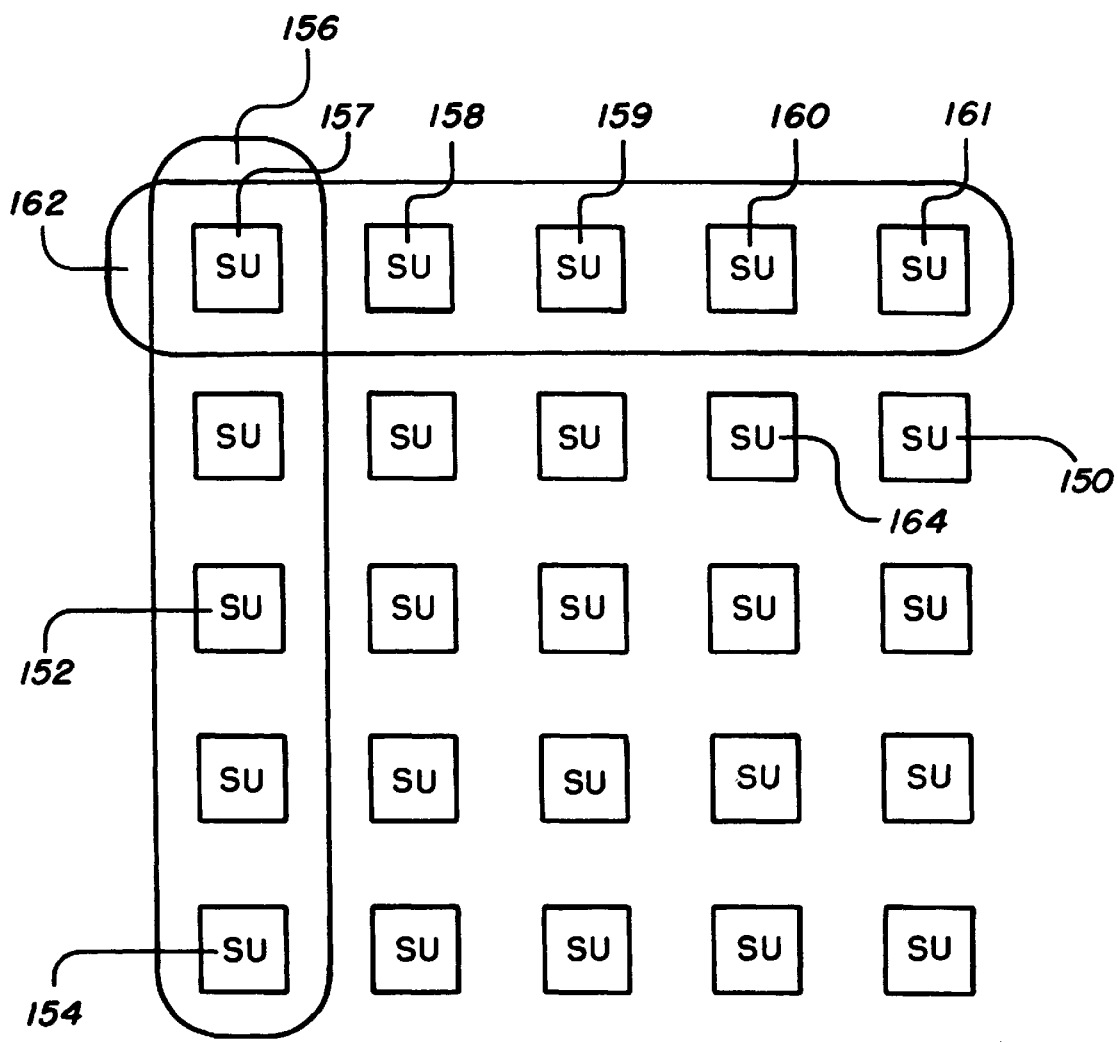
FIG. 1 shows one way to stripe a data object using storage striping techniques.
Figure 2:
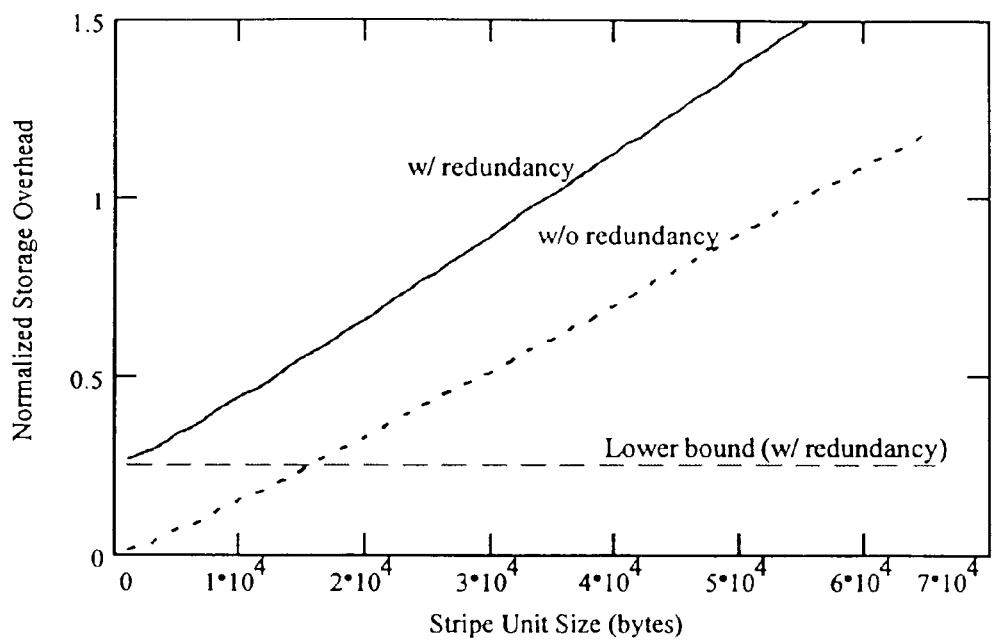
FIG. 2 shows a graph of normalized storage overhead versus the size of a stripe unit in storage striping.
Figure 3:
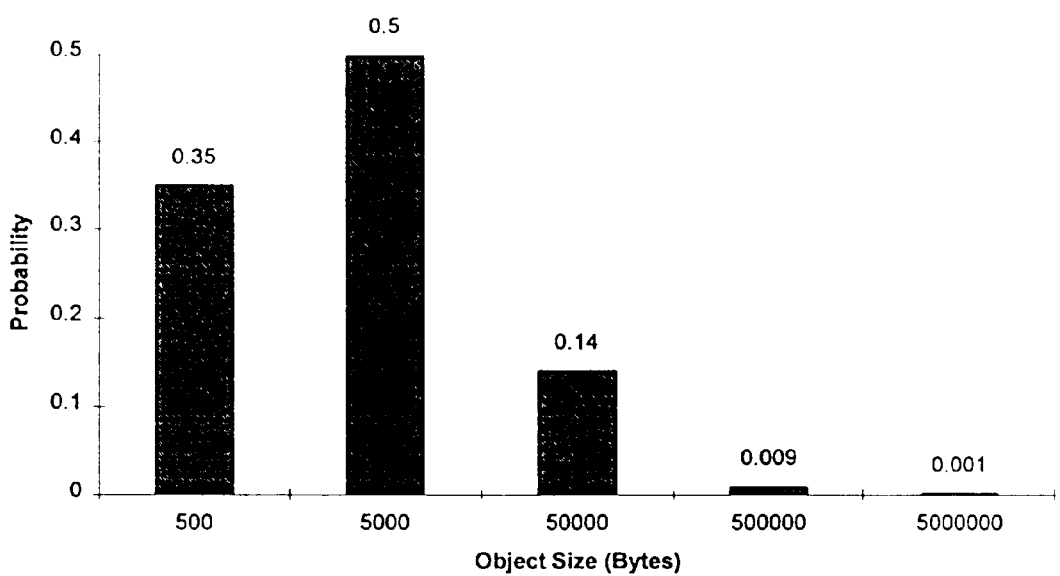
FIG. 3 shows the WebStone retrieval distribution for web servers.
Figure 4:
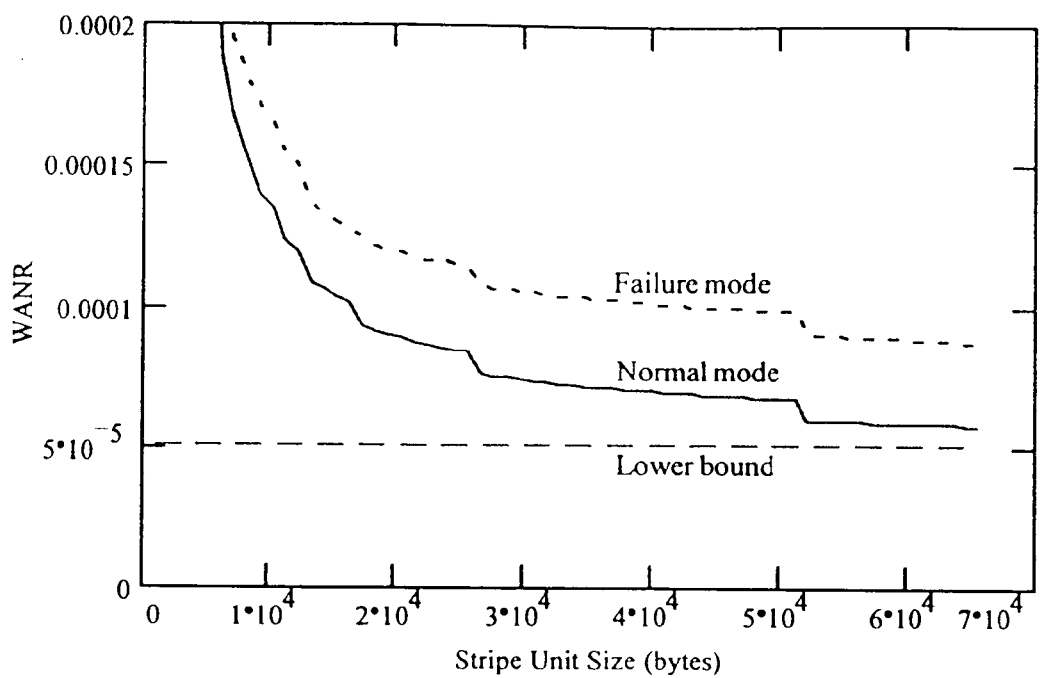
FIG. 4 shows a graph of weighted average number of retrieval per byte (WANR) against striping sizes in storage stripping.
Figure 5:
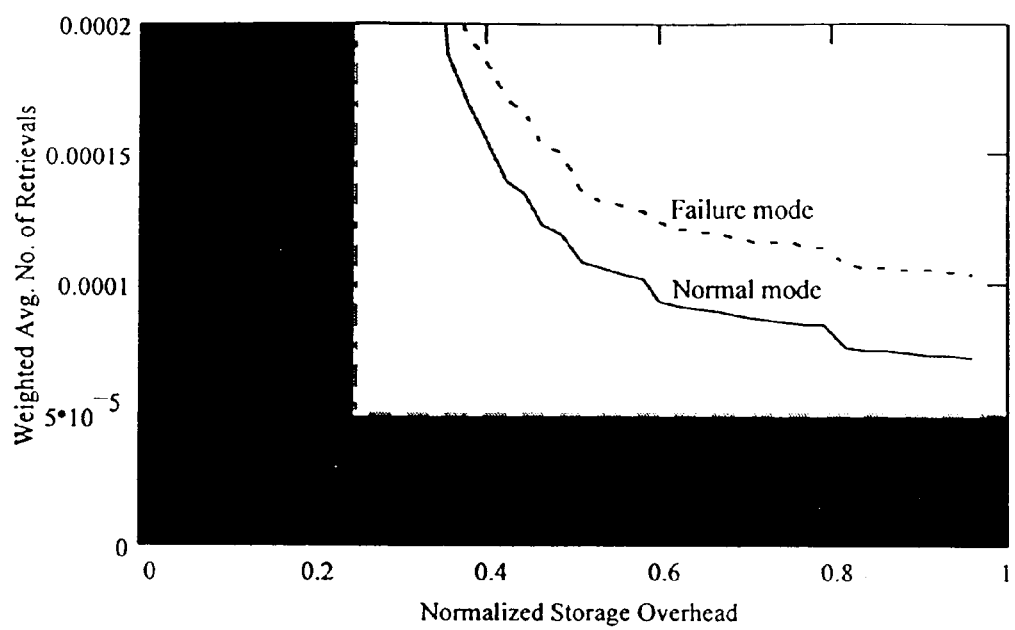
FIG. 5 shows the tradeoff in storage striping between two factors: weighted average number of retrieval per byte vs. normalized storage overhead.
Figure 6:
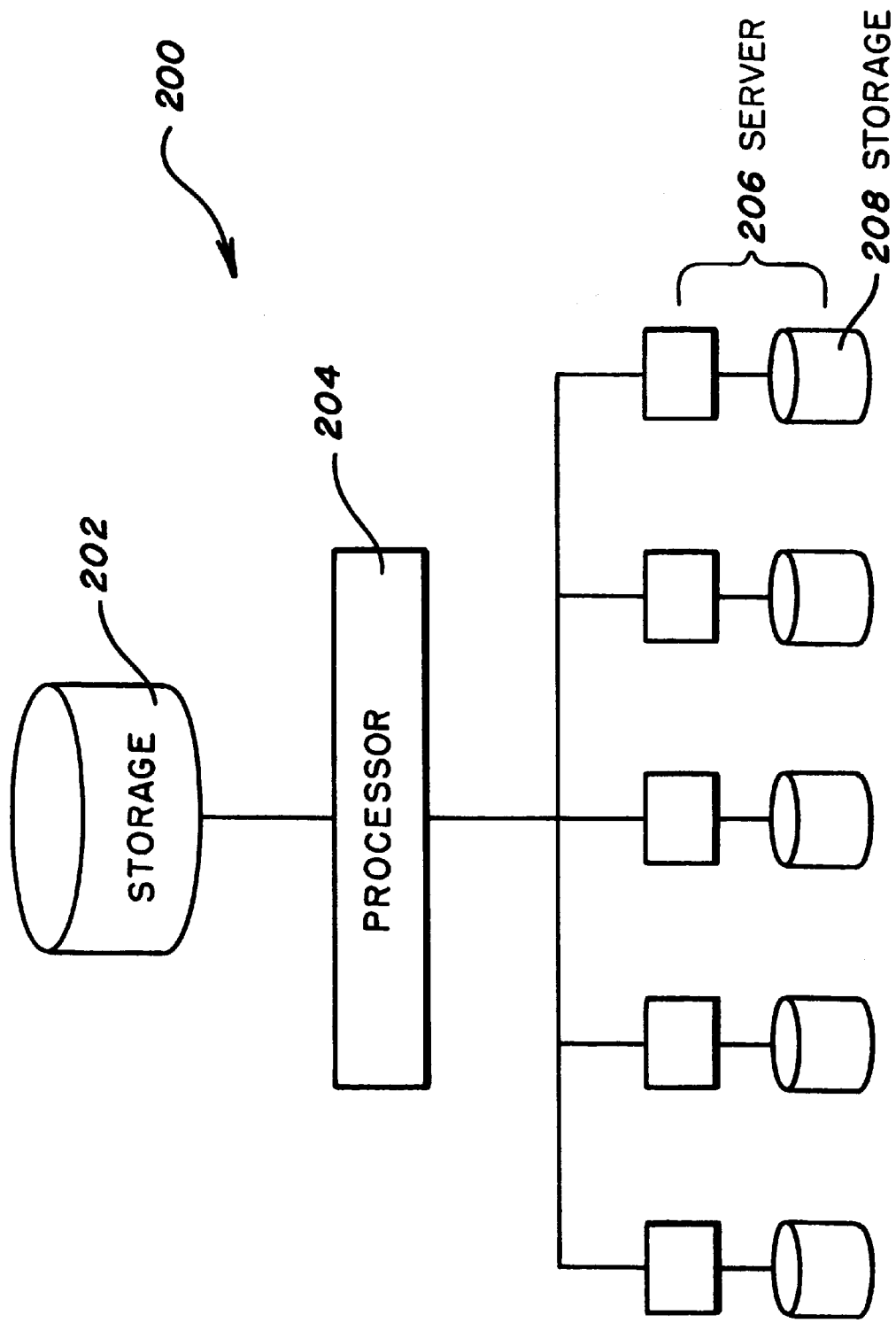
FIG. 6 shows an apparatus to implement the present invention.

FIG. 6 shows an apparatus 200 to implement the present invention. The apparatus 200 includes a main storage medium 202, such as a compact disk read-only memory (CD ROM). The medium 202 stores data objects to be striped. A management processor 204, disposed between an array of servers and the main storage medium 202, performs the striping process. The processor can be a computer. Each server includes a storage medium, such as the server 206 has its storage medium 208. Based on object striping, the management processor 204 stripes data objects into striping units, which can then be stored in the storage media of the servers in a round-robin fashion.

Figure 7:
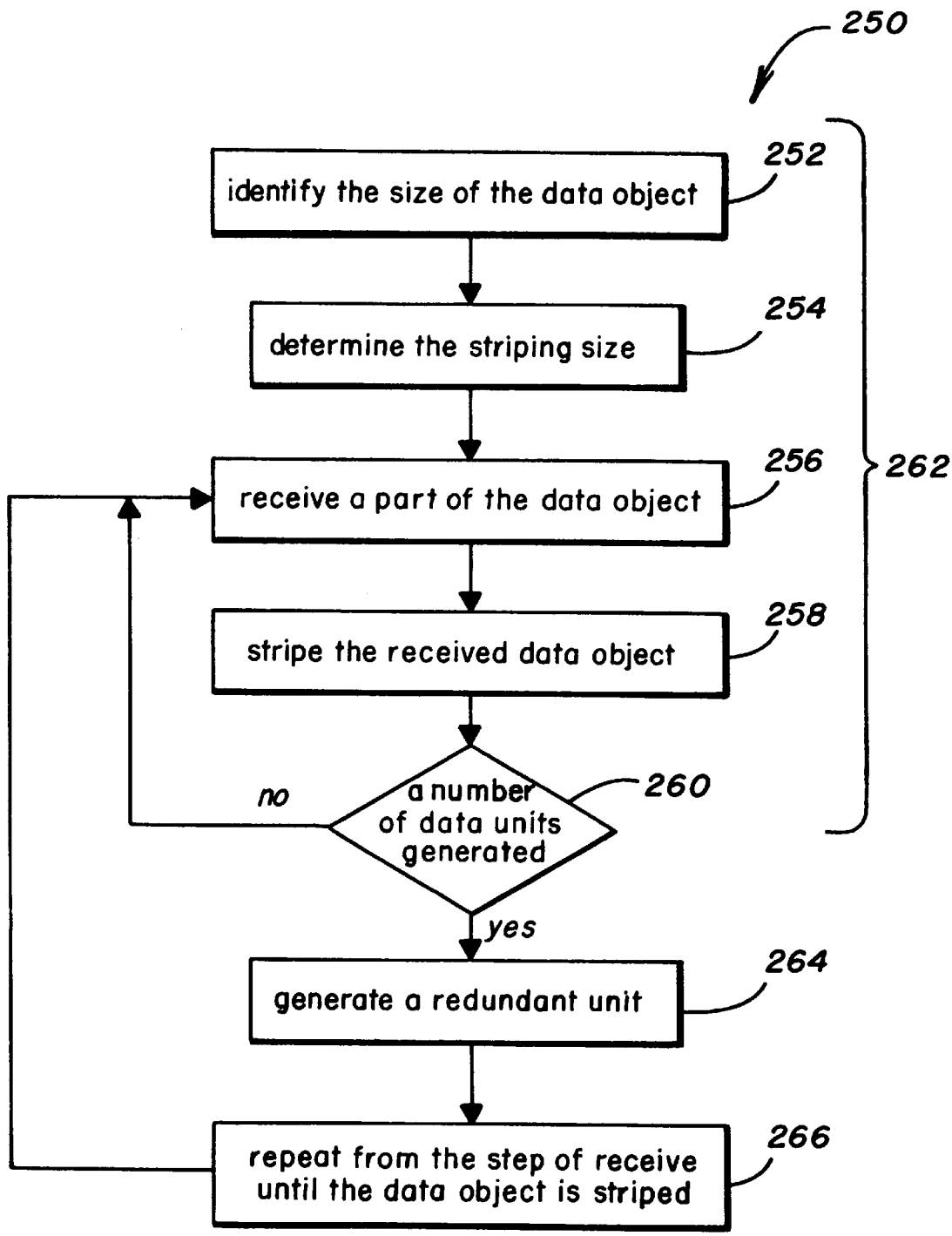
FIG. 7 shows one set of steps to implement one embodiment of the present invention.

FIG. 7 shows one set 250 of steps for the present invention to generate stripe units for a data object of any size. In the present invention, a stripe is defined as one or more data units and one or more redundant units such that the redundant units are generated by the data units. The stripe units, which can be data units or redundant units, are stored in the servers. First, a part of the data object that has not been striped before is striped (Step 262) into one or more data units. Then, at least one redundant unit is generated (Step 264) from the immediately striped data unit. The data units with the one or more redundant units generated together produce a stripe. The above steps are then repeated (Step 266) until the entire data object is striped.

In one embodiment, the striping process (Step 262) includes a number of steps. First, the processor 204 identifies (step 252) the size of the data object. This can be done in a number of ways. For example, the data object can have a header file storing its size. The processor 204 can retrieve the header file of the data object to identify the size of the data object. Using the size of the data object, the processor 204 determines (step 254) the striping size or the size of each striping unit for that data object. Then, the processor 204 receives (step 256) at least a part of the data object, with the size of that part being at least equal to the striping size. The received data object is striped (step 258) into a data unit based on the striping size. Steps 256 to 258 are repeated (Step 260) a number of times to generate a number of data units.

The data units and the redundant units are transmitted to the servers. This transmission step can be after the step of generating at least one redundant unit (Step 264). In another embodiment, the transmission and the receiving step can be performed simultaneously—while one unit is arriving, another is leaving. In yet another embodiment, a significant part of the data object is received before striping is done. In one other embodiment, transmission starts after the entire data object is striped (Step 266).

The striping size depends on a number of factors. As described, the striping size depends on the size of its corresponding data object. Unlike storage striping, in object striping, the striping size is not fixed just by the format of the storage media in the servers.

Figure 8:
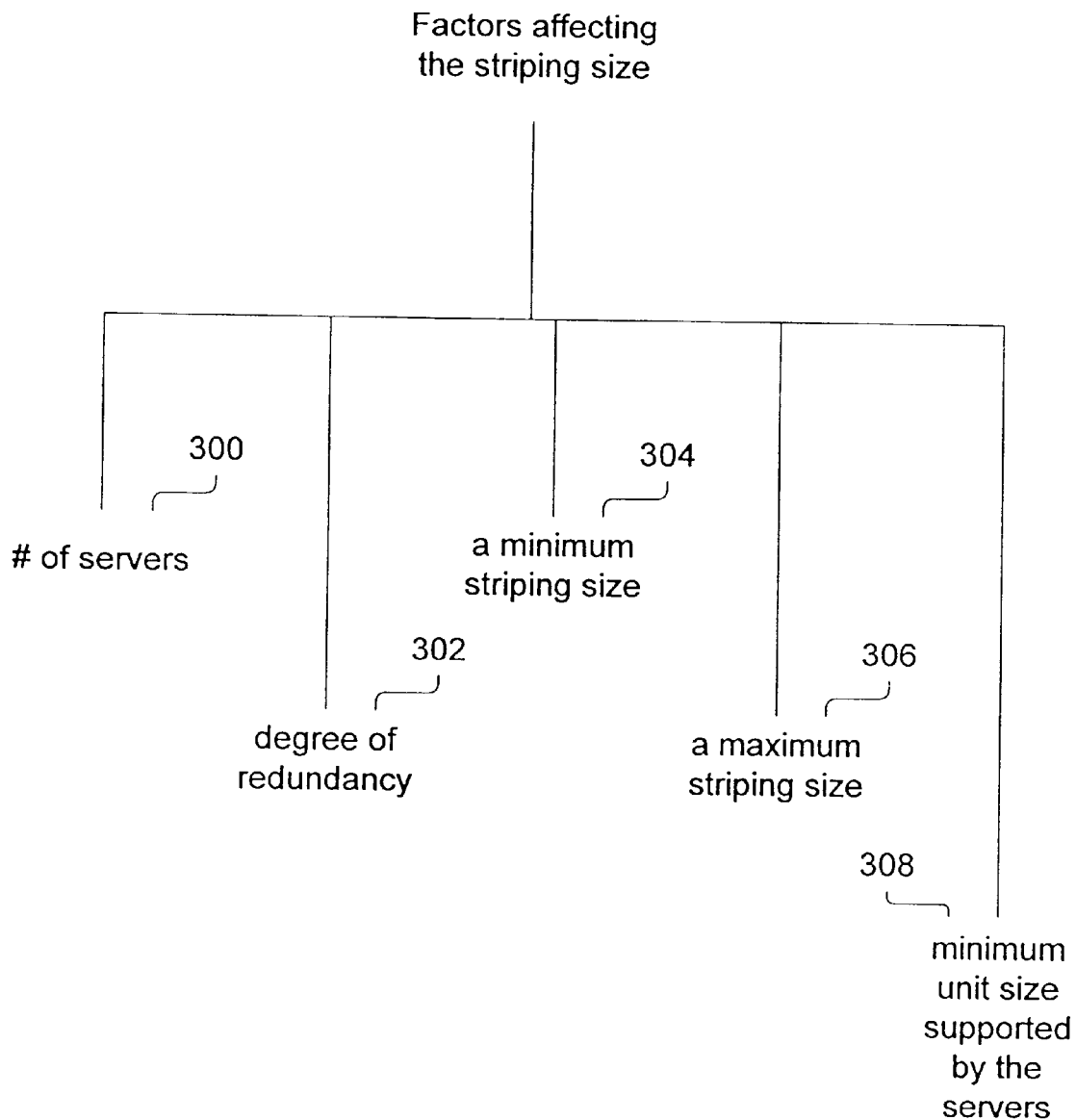
FIG. 8 depicts a number of factors determining the striping size of a data object.

FIG. 8 shows other factors determining the striping size in one embodiment. They include the number of servers 300, the level of redundancy 302, a user-defined minimum striping size 304 and maximum striping size 306, and the minimum unit size that can be supported by the servers 308.

The level of redundancy denotes the number of redundant units per stripe. For example, a (15,11) RS-code or Reed-Solomon code includes 4 redundant symbols in every 15 symbols. The level of redundancy is 4. In other words, data lost due to the failing of 4 servers can be reconstructed by the 4 redundant symbols.

Figure 9:
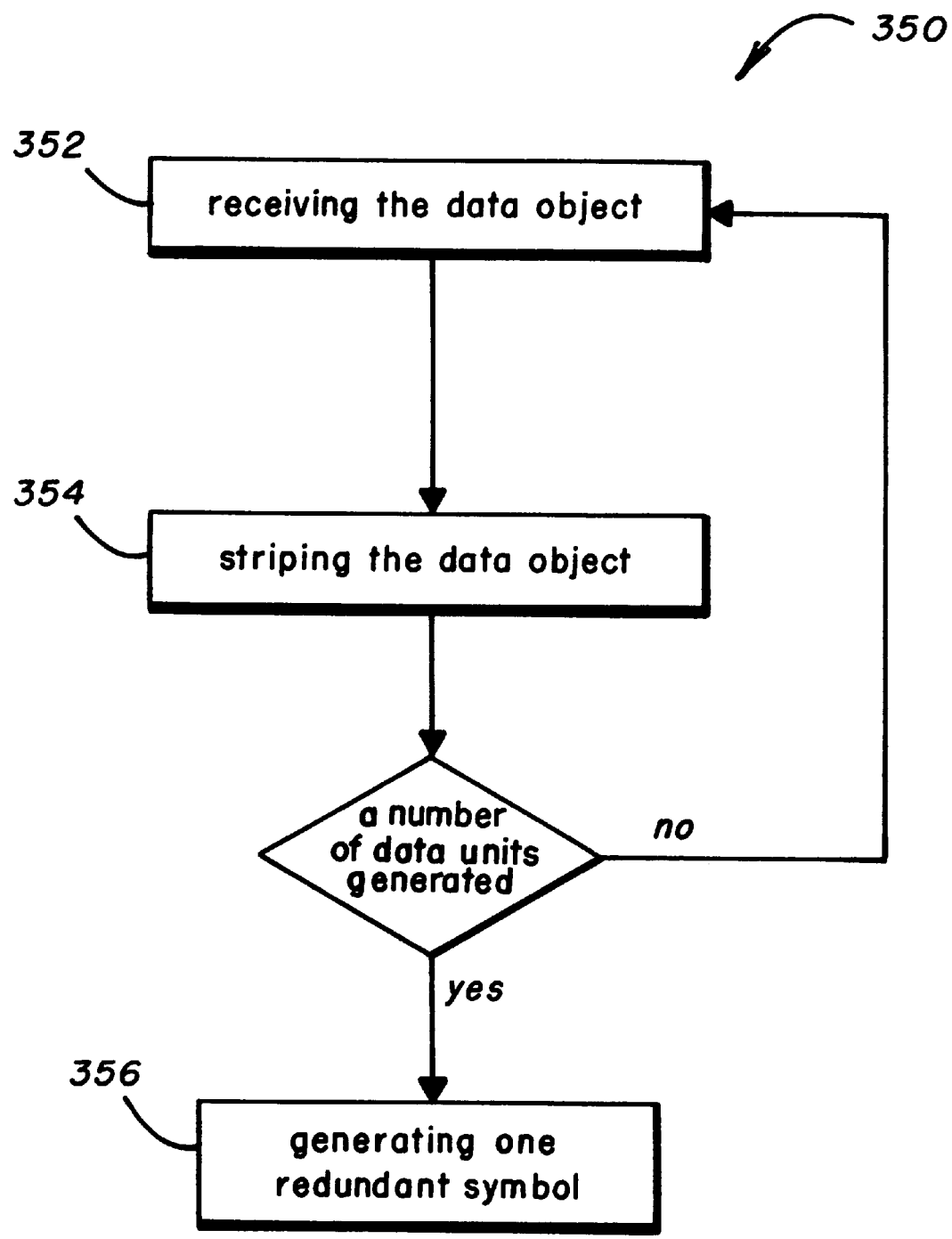
FIG. 9 shows a set of steps to generate a redundant symbol.

There are different ways to generate redundant symbols. For example, FIG. 9 shows a set 350 of steps to generate a redundant symbol. First, the processor 204 receives (step 352) and stripes (step 354) a data object. After generating a number of data units, the processor 204 generates (step 356) at least one redundant symbol, based on methods that should be obvious to those skilled in the art.

The user-defined minimum striping size sets the lower limit of the size of a striping unit. The striping size should not be smaller than the minimum striping size. One reason to set the lower limit is that if the striping size is too small, the number of retrieval from the servers to re-generate a data object from the stripe units may be too large.

The user-defined maximum striping size sets the upper limit of the size of a striping unit. The striping size should not be larger than the maximum striping size. One reason to set the upper limit is that if the striping size is too large, there might be load imbalance. A server might be accessed significantly more than others. Setting the upper limit balances the load in accessing the servers to re-generate data objects from stripe units.

The minimum unit size that can be supported by servers is typically set by the servers' storage media. A storage medium typically has a storage allocation unit, which is the minimum unit size that can be supported by the storage medium. All of the stripe unit sizes should be integral multiples of this storage allocation unit, where the multiple in this case can be one.

One set of programming steps that tie the different factors together to determine the striping size of a data object is shown in the following. In this application, this approach is known as Dynamic Object Striping (DOS), which implies that the striping size can be set dynamically.

Variable
$Q_{max}$: maximum striping size
$Q_{min}$: minimum striping size
k : level of redundancy
b : size of data object
U : storage allocation unit
$N_s$ : number of servers
q : the assigned stripe unit size.

Program
01. $N_D = N_s - k$
02. if $(b \leq Q_{min})$
03. then $q = \lceil b/U \rceil U$
04. else if $(b \leq Q_{min} N_D)$
05. then $q = Q_{min}$
06. else if $(b < Q_{max} N_D)$
07. then $q = \lceil b/(N_D U) \rceil U$
08. else $q = Q_{max}$ where $\lceil x \rceil$ denotes the immediate integer larger than x, if x is not an integer; for example, $\lceil 12.5 \rceil = 13$.

As one example, $Q_{min}$ can be set to be equal to the size of the storage allocation unit, and $Q_{max}$ can be set to be equal to the average object size of the different objects in the servers divided by the number of data units per stripe. Note that in the present invention, $Q_{max}$ is bigger than $Q_{min}$, and $Q_{max}$ is also an integral multiple of the storage allocation unit size.

In the above programming steps, if $Q_{min}$ is set to be equal to $Q_{max}$, all data objects will be striped using the same stripe size. In the present application, this approach is known as Fixed Object Striping (FOS), which is suitable for data objects of similar sizes.

Note that FOS is still different from storage striping. This is because striping is still focused on the data object, not the storage medium. A stripe contains stripe units from the same data object because a data stripe is mapped logically to storage units. For the same reason, a stripe can be shorter than the number of servers, depending on the size of the data object and stripe unit. Thus, when a server fails, only stripe units belonging to the data object need to be retrieved for lost data reconstruction.

Figure 10A:
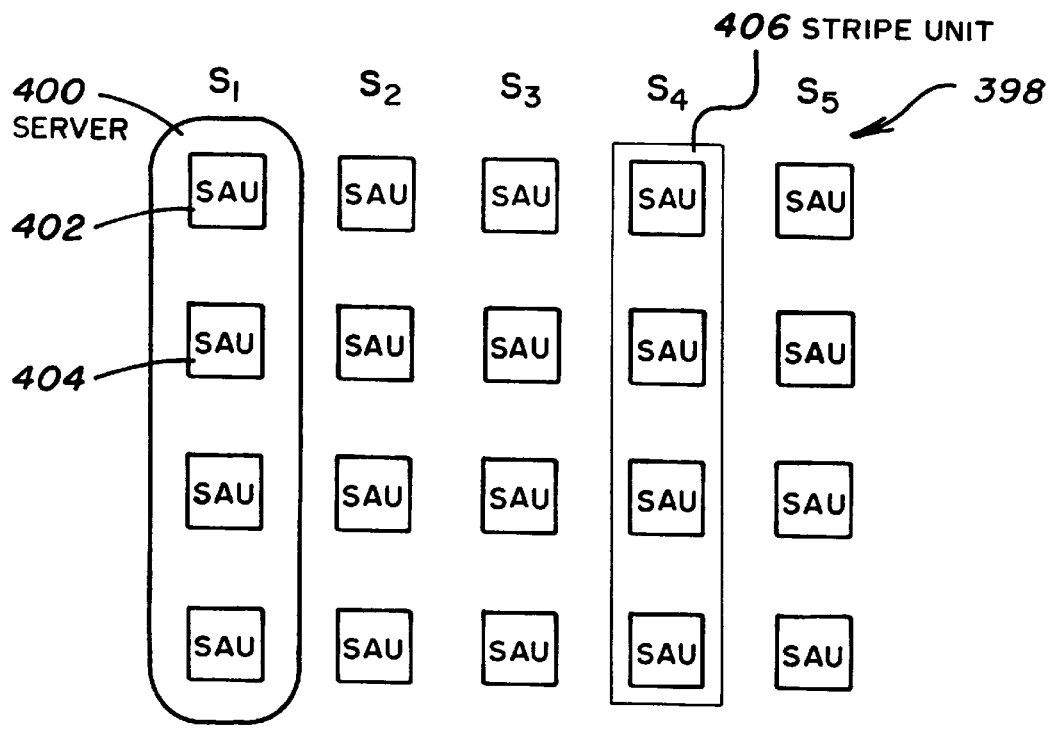
FIGS. 10A–B show two examples of striping two data objects using the present invention.
Figure 10B:
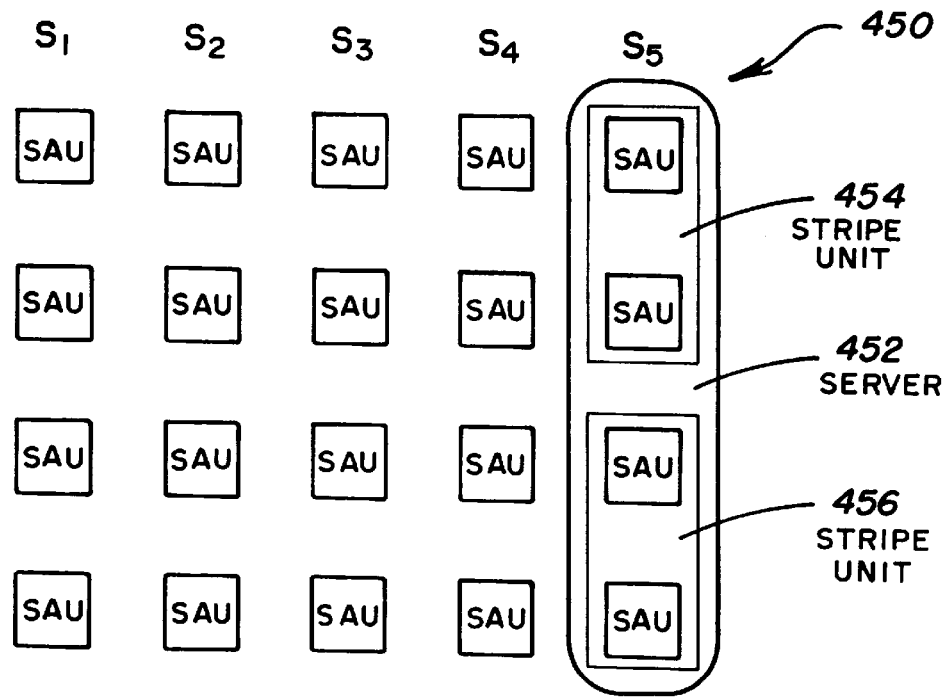

FIGS. 10A–B show two examples of striping two data objects using different stripe size and redundancy. In the example 398 shown in FIG. 10A, the programming steps above determine that the striping size should be 4 storage allocation units. There are five servers, S1 to S5. Each server has four storage allocation units, such as the server 400 has the storage allocation units 402 and 404. With the striping size set to be 4, each server holds one striping unit, such as the striping unit 406. In the example 450 shown in FIG. 10B, the programming steps above determine that the striping size should be 2 storage allocation units. Each server carries four storage allocation units, which implies that each server carries two stripe units, such as the server 452 carries the stripe units 454 and 456.

As illustrated in FIGS. 10A–B, a stripe always contains stripe units from the same data object. This is because a stripe is mapped logically to servers. Accordingly, a stripe can be shorter than the number of servers depending on the size of the data object and stripe unit, as in FIG. 10B. Due to these properties, only stripe units belonging to the data object need to be retrieved for lost data reconstruction for both FOS and DOS.

Figure 11:
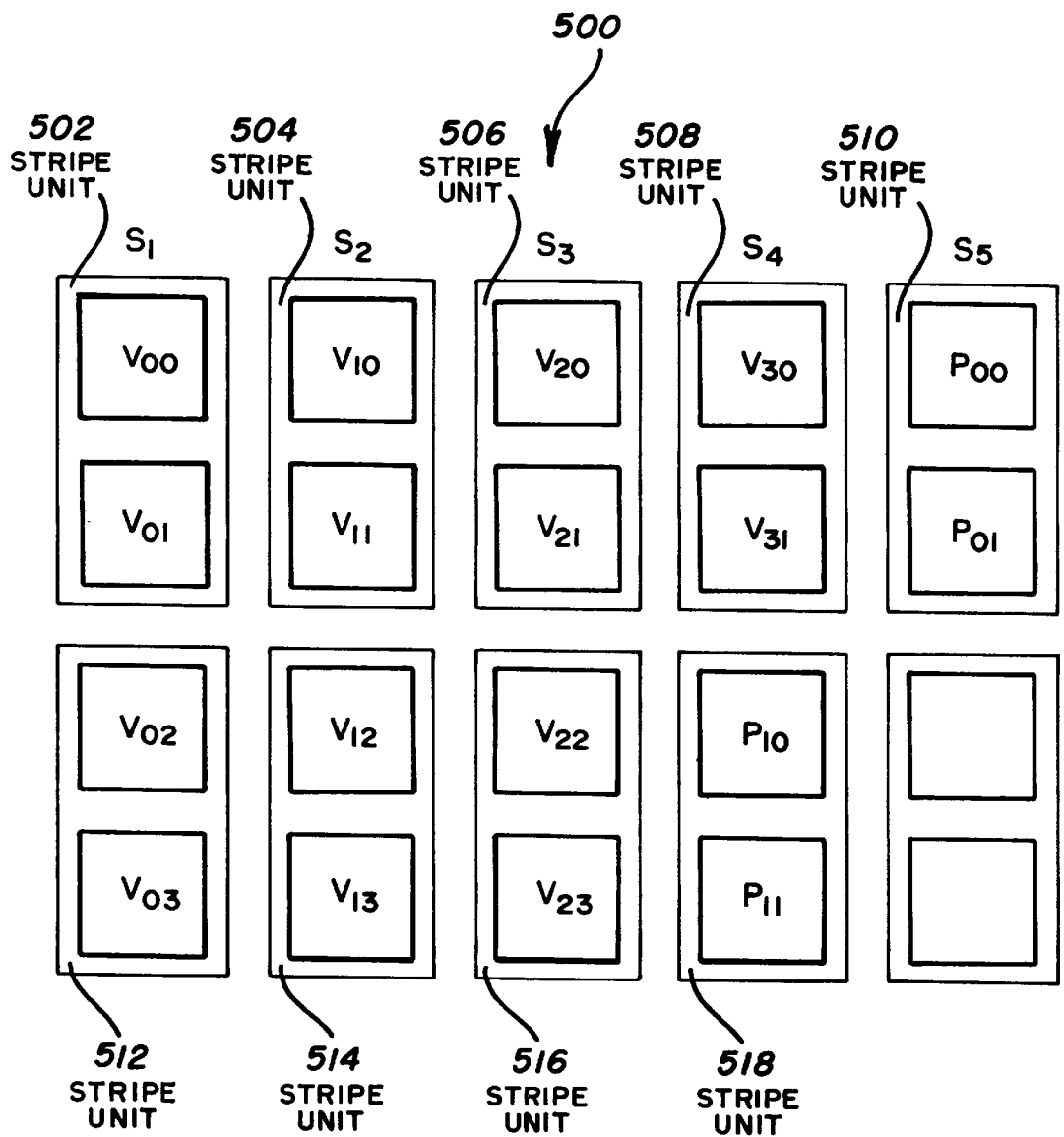
FIG. 11 shows an example of re-constructing lost data when one server fails for object striping.

FIG. 11 shows an example of re-constructing lost data when one server fails. In this example, each stripe unit size holds two storage allocation units. Some of the stripe units hold data objects, while other stripe units hold redundant symbols. In this example, a storage allocation unit represented by $V_{i,j}$ denotes holding data objects, and a unit represented by $P_{i,j}$ denotes holding redundant symbols.

Assume that the server 500 fails. Re-construction can be done at a number of places. In one embodiment, a client accesses the servers. After accessing the striping units 502, 504, 508, 510, 512, 514 and 518, the client reconstructs the striping units 506 and 516 in the failed server. The reconstruction can be done, for example, as follows:

$$V_{2,0}=V_{0,0} \oplus V_{1,0} \oplus V_{3,0} \oplus P_{0,0} \quad (1)$$

$$V_{2,2}=V_{0,2} \oplus V_{1,2} \oplus P_{1,0} \quad (2)$$

where $\oplus$ denotes the exclusive-or operation. As shown in equation (2), the allocation unit $V_{2,2}$ is reconstructed by data from three servers only. In storage striping, to reconstruct loss data in a stripe, one retrieves all the stripe units from an entire stripe, which resides in each of the servers. However, in object striping, one only has to retrieve stripe units that belong to the data object.

Figure 12:
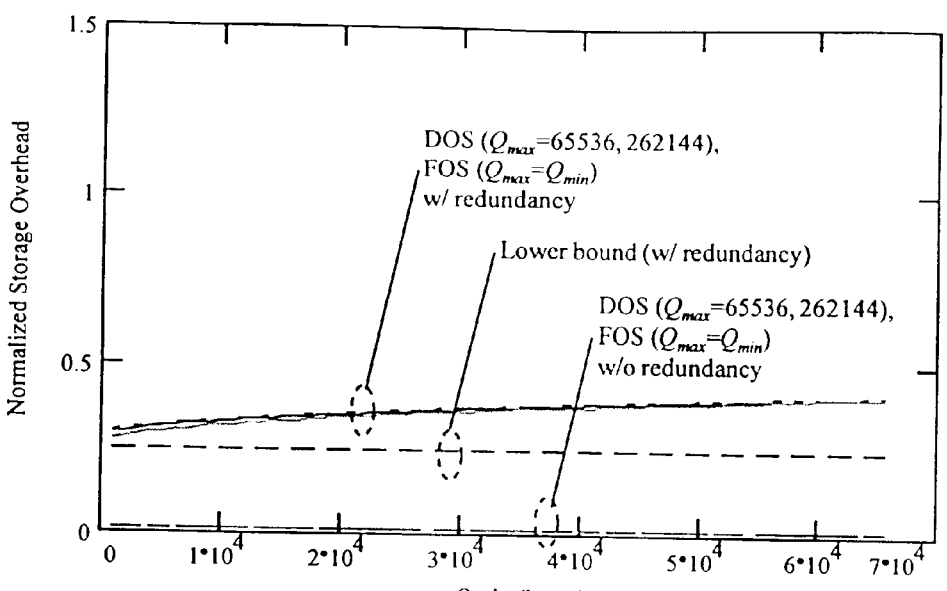
FIG. 12 is a graph on normalized storage overhead versus the user-defined minimum striping size $Q_{min}$ for object striping.

Based on the same data set as in the storage striping example in the background, a number of results are calculated. First, consider internal fragmentation. FIG. 12 is a graph on normalized storage overhead NSO versus the user-defined minimum striping size $Q_{min}$. Unlike storage striping, NSO does not increase linearly with respect to the minimum striping size. Instead, compared with storage striping, the NSO in object striping is relatively constant, and does not exceed 0.5. The slight increase is due to increase in redundancy overhead because internal fragmentation is independent of the stripe size. Also, object striping needs significantly less storage overhead for larger stripe sizes. One calculation to generate FIG. 12 is shown in Appendix C.

Figure 13:
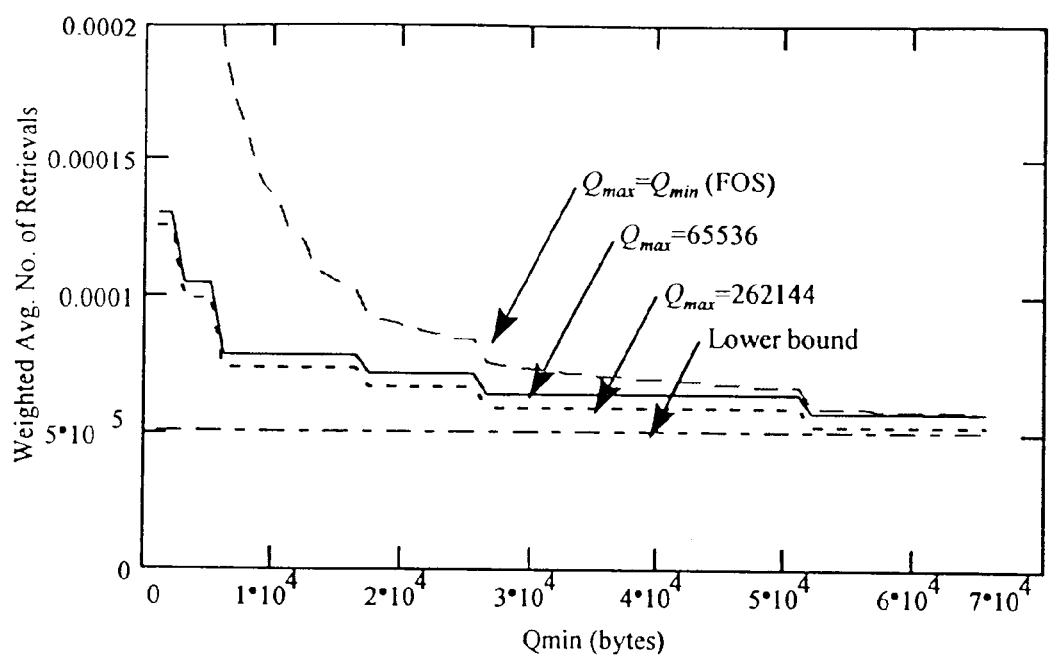
FIG. 13 plots the weighted average number of retrievals per byte versus the user-defined minimum striping size $Q_{min}$ for object striping.

Another issue is retrieval efficiency. Based on the same WebStone retrieval distribution as in storage striping, FIG. 13 is generated. It plots the weighted average number of retrievals per byte (WANR) versus the user-defined minimum striping size $Q_{min}$ for object striping. As in storage striping, retrieval efficiency increases with larger $Q_{min}$. One calculation to generate FIG. 13 is shown in Appendix D.

Figure 14:
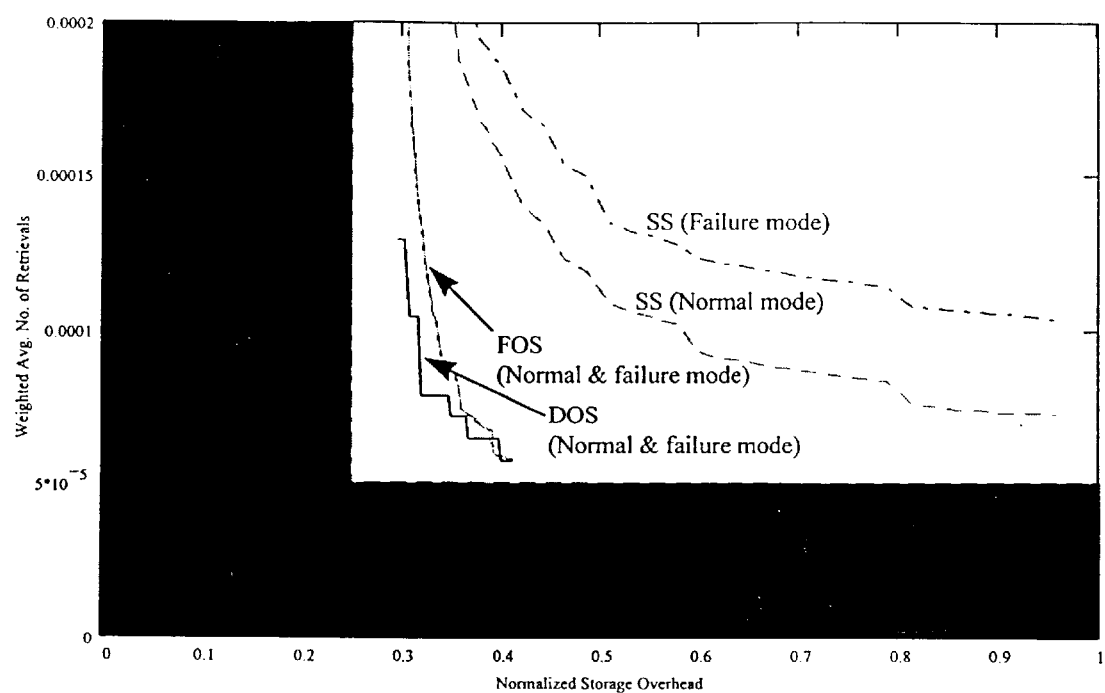
FIG. 14 plots the weighted average number of retrievals per byte versus the normalized storage overhead for object striping and storage striping.
Figure 15:
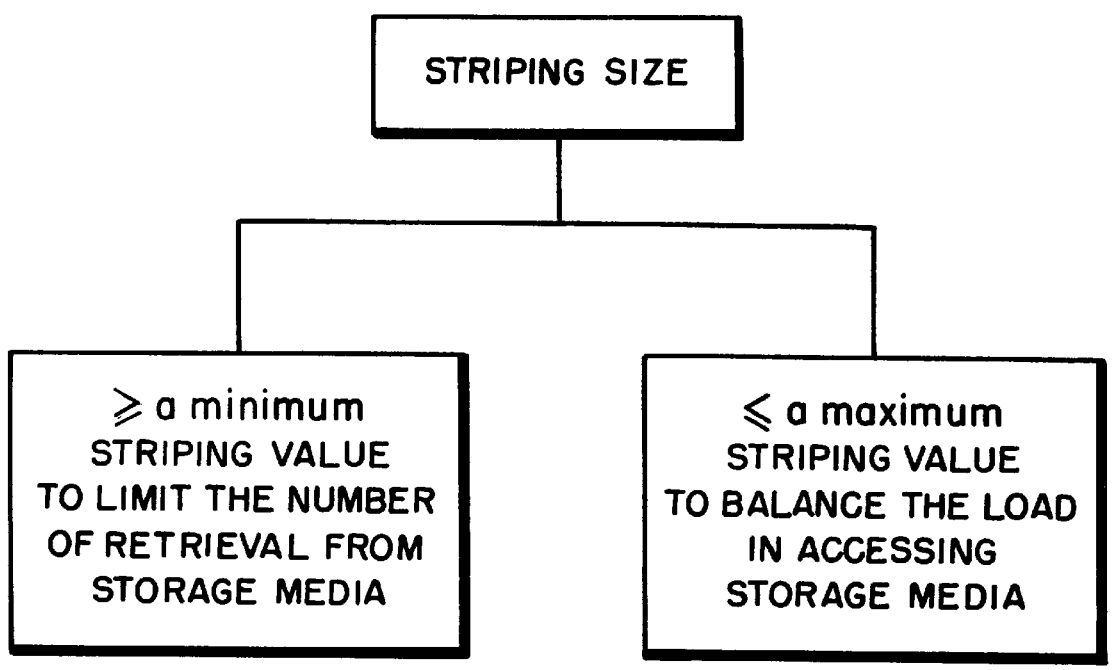
FIG. 15 shows embodiments of striping sizes in the present invention.

FIG. 14 plots the weighted average number of retrievals per byte versus the normalized storage overhead for object striping and storage striping. As shown in the figure, under the same storage overhead, object striping has significantly better retrieval efficiency than storage striping. Also, object striping has no performance degradation in retrieval efficiency when server fails. Another observation from the figure is that the improvement of DOS over FOS is significant only at small storage overhead constraints.

Finally, experimental results indicate that object striping has better throughput than storage striping. For example, with normalized storage overhead fixed at 0.3 and with eight servers, object striping at 730 kilobytes per second per server has more than 40% higher throughput than storage striping at 500 kilobytes per second per server.

In the present invention, symbols and units are used interchangeably. However, a unit can have more than one symbol.

From the foregoing it should be appreciated that object striping has significant better performance than storage striping. By focusing on the data object, object striping provides low overhead storage and high retrieval efficiency at the same time. The invented object striping technique can be applied to both an array of storage media and an array of servers.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Appendix A

Given $N_s$ servers in the server array, k redundant units for redundancy, $N_D$ data units with $N_D$ being equal to $N_S-k$, and data object of size b bytes, the amount of unused storage in the last stripe unit is given by $$f(b)=q-mod(b,q) \quad (1)$$

where mod(b,q) returns the remainder of b/q. Hence the total internal fragmentation for all $N_b$ data objects stored in the system is $$F = \sum_{i=1}^{N_b} f(b_i) \quad (2)$$

The total number of stripe units required to store all $N_b$ objects is $$N_u = \sum_{i=1}^{N_b} \lceil b_i/q \rceil \quad (3)$$

Similarly, the minimum number of stripes required to hold all these stripe units is $$N_v = \lceil N_u/N_D \rceil \quad (4)$$

Since k stripe units are reserved for redundancy in every stripe of $N_S$ stripe units, the total redundancy overhead is simply given by $$G = N_v k q \quad (5)$$

To obtain the total storage overhead, the total internal fragmentation is summed with the total redundancy overhead. To ease comparison, a Normalized Storage Overhead (NSO) is defined as follows:

$$S = \frac{F+G}{\sum_{i=1}^{N_b} b_i} \quad (6)$$

Substituting into Equations 1–5, one gets $$S = \frac{\left(\sum_{i=1}^{N_b}(q - \mathrm{mod}(b, q))\right) + \left\lceil\left(\sum_{i=1}^{N_b}\lceil b_i/q\rceil\right)/N_D\right\rceil ku}{\sum_{i=1}^{N_b} b_i} \quad (7)$$

For example, a NSO value of 0.5 means 50% more additional storage spaces (relative to total amount of data stored) are required due to internal fragmentation and redundancy overhead. Given a redundancy k, the lower bound for the NSO is derived. The minimum possible internal fragmentation should be zero, and for every $N_D$ bytes of data stored, k additional bytes are required for redundancy. Hence the lower bound for NSO is $$S_{\min} = \frac{\left\lceil\sum_{i=1}^{N_b} b_i/N_D\right\rceil k}{\sum_{i=1}^{N_b} b_i} \quad (8)$$

To obtain numerical evaluation, the data-set located at the following web server (http://adnetpc0.ie.cuhk.edu.hk/) was used as the $b_i$'s. The following figure shows the data object size distribution of this data-set. This data-set has been compared with a number of other web site data-sets and it has been found that they have similar distributions. In subsequent numerical evaluations, the embodiment is assumed to be a 5-servers server array ($N_S=5$) with redundancy of 1 (k=1).

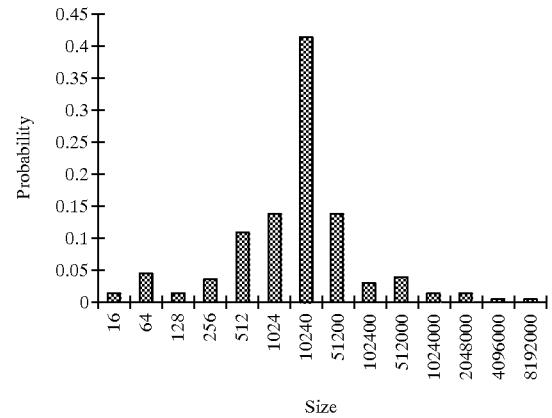

Data object size distribution of a web site data-set.

Appendix B

For a data object of size b bytes and stripe unit size q bytes, the total number of retrievals required to retrieve the entire object during normal-mode operation (i.e. without server failure) is $$r_n(b) = \lceil b/q \rceil \quad (1)$$

Under failure mode, the number of transactions required depends on how the data object is stored and which server fails. To calculate the average number of retrievals required, each server is assumed to be equally likely to fail. For example, if stripe units of a data object are packed using a minimum number of stripes, then the least number of retrievals is needed. This should be the best-case scenario, and is assumed to be the situation for all stored data objects. Therefore for a data object of $\lceil b/q \rceil$ stripe units, the stripe units will span $\lceil b/(qN_D)\rceil$ stripes. The number of stripe units in the last stripe can be calculated from $$x(b) = \mathrm{mod}(\lceil b/q \rceil - 1, N_D) + 1 \quad (2)$$

To cater for the case where the last stripe has $N_D$ units, one is subtracted from the total number of stripe units before taking modulus and then one is added afterwards. Since all servers are equally likely to fail, the probability of having a failed unit in the last stripe, denoted as event E, is $$Pr\{E\} = \frac{x(b)}{N_S} \quad (3)$$

Hence conditioning on this event E, the expected number of retrievals required is:

$$r_f(b) = (\text{No. of retrievals given } E)Pr\{E\} + (\text{No. of retrievals given not } E)(1 - Pr\{E\}) \quad (4)$$

$$r_f(b) = \quad (5)$$
$$(\lceil b/(qN_D)\rceil N_D)\frac{x(b)}{N_S} + (\lfloor b/(qN_D)\rfloor N_D + \lceil \mathrm{mod}(b, N_D q)/q\rceil)\left(1 - \frac{x(b)}{N_S}\right)$$

Equations (1) and (5) give the expected number of retrievals for retrieving a data object of size b bytes under normal mode and single-server failure mode respectively. To characterize the practical performance of a system with various types of objects, the pattern that data are retrieved has to be considered. The probability of retrieving a data object of size $B_i$ bytes is assumed to be known and is denoted by $P_i$, where $$\sum_i P_i = 1 \qquad (6)$$

Using this knowledge, a Weighted Average Number of Retrievals Per Byte (WANR) is defined to characterize the retrieval efficiency for normal and failure mode operations:

$$W_n = \frac{\sum_i r_n(B_i)P_i}{\sum_i B_i P_i} \qquad (7)$$

$$W_f = \frac{\sum_i r_f(B_i)P_i}{\sum_i B_i P_i} \qquad (8)$$

Regardless of the striping scheme, at least one retrieval per data object is needed. Hence the lower bound for WANR is calculated as follows:

$$W_{min} = \frac{\sum_i 1 \cdot P_i}{\sum_i B_i P_i} = \frac{1}{\sum_i B_i P_i} \qquad (9)$$

Again, the retrieval distribution is needed to evaluate WANR numerically. In this respect, the WebStone retrieval distribution is used (shown in FIG. 3), which is generally considered typical in large and busy web sites. Note that there are only five samples in the WebStone distribution and as a result, steps exist in the resultant WANR evaluations.

Appendix C

In object striping, storage spaces are allocated in units of U bytes. Hence the internal fragmentation may be considered as the wasted storage at the last allocated storage unit for storing the data object:

$$f(b) = U - mod(b, U) \qquad (1)$$

Hence summing over all objects in the system gives the total internal fragmentation:

$$F = \sum_{i=1}^{N_b} f(b_i) \qquad (2)$$

To derive the redundancy overhead, two cases shown in the following figure are considered. If the last data stripe contains more than one complete stripe units (i.e. $mod(b_i, N_D q_i) \geq q_i$, then $kq_i$ bytes of redundancy for the last data stripe are needed. However, if there are less than one complete stripe unit (i.e. $mod(b_i, N_D q_i) < q_i$), then partial redundancy units can be used. For all other data stripes, each requires k complete redundancy units. Hence the redundancy overhead is $$g_i = \begin{cases} \left\lfloor \frac{b_i}{N_D q_i} \right\rfloor k_i q_i + \left\lceil \frac{mod(b_i, q_i N_D)}{U} \right\rceil k_i U & \text{if } mod(b_i, N_d q_i) < q_i \\ \left\lceil \frac{b_i}{N_D q_i} \right\rceil k_i q_i & \text{otherwise} \end{cases} \qquad (3)$$

Summing over all data objects in the system gives the total redundancy overhead:

$$G = \sum_i g_i \qquad (4)$$

Equations (2) and (4) are substituted into the Equation (6) in Appendix A to obtain the Normalized Storage Overhead of object striping.

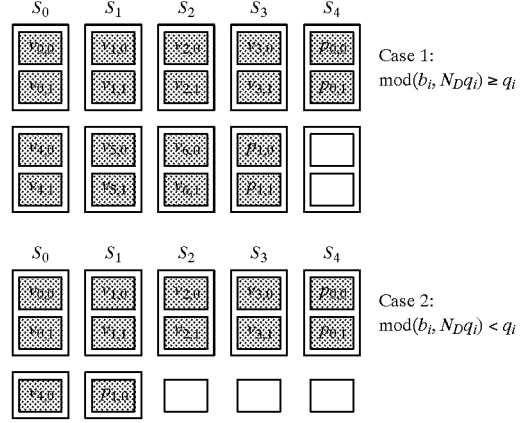

Two cases in calculating redundancy overhead for a data object.

Appendix D

Given an object with size b bytes, the program in the detailed description will assign a stripe unit size. Since the assignment is a function of b, DSA(b) is used to denote the assigned stripe unit size. When there are no server failures, the total number of retrievals required to retrieve the object is $$r(b) = \lceil b/DSA(b) \rceil \qquad (1)$$

One distinct feature of object striping is that the number of retrievals required under failure mode is the same as that under normal mode. To see why, consider an arbitrary data stripe of x units and k redundancy units. At normal mode, only those x stripe units will be retrieved, ignoring the k redundancy units. Now when a server fails, either one of the x stripe units or one of the k redundancy units will become inaccessible. If the former is true one more redundancy unit has to be retrieved for data reconstruction, i.e. total (x−1)+1=x retrievals. If the latter is true then all data units are still accessible, hence requiring the same x retrievals. Therefore Equation (1) also gives the number of retrievals required under failure mode. Again the Equation (7) in Appendix B sets the definition of Weighted Average Number of Retrievals Per Byte. The retrieval efficiency of object striping (same under normal and failure mode) is characterized as:

$$W_n = \frac{\sum_i r(B_i)P_i}{\sum_i B_i P_i} \qquad (2)$$

Using the same WebStone retrieval distribution as in storage striping, the WANR of object striping is plotted.

What is claimed is:

1. A method for generating stripe units in a stripe for a data object which can be of any size, wherein:

a stripe is defined as having one or more data units and one or more redundant units with the redundant units being generated by the data units, a stripe unit can be a data unit or a redundant unit; and the stripe units are to be stored in a plurality of storage media; and the method comprising the steps of:

striping a part of the data object that has not been striped before into at least one data unit;

generating at least one redundant unit from the immediately striped at least one data unit to produce a stripe; and repeating from the step of striping until the entire data object is striped;

wherein the step of striping further comprises the steps of:

identifying the size of the data object:

determining the striping size based on the size of the data object;

receiving at least a part of the data object, with the size of that part being at least equal to the striping size;

striping the received data object into a data unit based on the striping size; and if the part of the data object that has not been striped before is to be striped into more than one data unit, then repeating from the step of receiving to generate the data units.

2. A method as recited in claim 1 further comprising the step of storing the data units with the one or more redundant units after the step of generating, in a round-robin configuration into the storage media.

3. A method as recited in claim 1 wherein the striping size is equal to an integral multiple of a minimum unit size supported by the storage media.

4. A method as recited in claim 3 wherein:

the multiple can be less than the number of units of storage media; and if a storage medium fails with its data lost, only stripe units belonging to the data object need to be retrieved to reconstruct the lost data.

5. A method as recited in claim 1 wherein the striping size depends on the number of units of storage media.

6. A method as recited in claim 1 wherein:

for fault tolerance, the method includes a level of redundancy; and the striping size depends on the level of redundancy.

7. A method as recited in claim 1 wherein the striping size is no less than a minimum striping value so as to limit the number of retrievals from the storage media to re-generate the data object from the stripe units.

8. A method as recited in claim 1 wherein the striping size is no bigger than a maximum striping value so as to balance the load in accessing the storage media to re-generate the data object from the stripe units.

9. A method as recited in claim 1 wherein the storage media reside in a plurality of server computers.

10. A method as recited in claim 9 further comprising the step of storing the data units with the one or more redundant units after the step of generating, in a round-robin configuration into the storage media.

11. A method as recited in claim 10 wherein the striping size is equal to an integral multiple of a minimum unit size supported by the storage media.

12. A method as recited in claim 11 wherein:

the multiple can be less than the number of units of storage media; and if a storage medium fails with its data lost, only stripe units belonging to the data object need to be retrieved to reconstruct the lost data.

13. A method as recited in claim 12 wherein the striping size depends on the number of units of storage media.

14. A method as recited in claim 13 wherein:

for fault tolerance, the method includes a level of redundancy; and the striping size depends on the level of redundancy.

15. A method as recited in claim 14 wherein the striping size is no less than a minimum striping value so as to limit the number of retrieval from the storage media to re-generate the data object from the stripe units.

16. A method as recited in claim 15 wherein the striping size is no bigger than a maximum striping value so as to balance the load in accessing the storage media to re-generate the data object from the stripe units.

* * * * *